(12) United States Patent
Tait et al.

(10) Patent No.: US 8,551,572 B1
(45) Date of Patent: Oct. 8, 2013

(54) SPRAY TEXTURE MATERIAL COMPOSITIONS, SYSTEMS, AND METHODS WITH ANTI-CORROSION CHARACTERISTICS

(75) Inventors: William Stephen Tait, Madison, WI (US); John Kordosh, Simi Valley, CA (US)

(73) Assignee: Homax Products, Inc., Bellingham, WA (US)

( * ) Notice: Subject to any disclaimer, the term of this patent is extended or adjusted under 35 U.S.C. 154(b) by 0 days.

(21) Appl. No.: 13/610,743

(22) Filed: Sep. 11, 2012

Related U.S. Application Data

(63) Continuation of application No. 13/396,538, filed on Feb. 14, 2012, now abandoned, which is a continuation of application No. 13/181,326, filed on Jul. 12, 2011, now abandoned, which is a continuation of application No. 12/837,254, filed on Jul. 15, 2010, now abandoned, which is a continuation of application No. 12/080,096, filed on Mar. 31, 2008, now abandoned.

(60) Provisional application No. 60/922,041, filed on Apr. 4, 2007.

(51) Int. Cl.
*B05D 1/02* (2006.01)

(52) U.S. Cl.
USPC ............................ 427/421; 516/8; 239/337

(58) Field of Classification Search
USPC ............................ 427/421; 516/8; 239/337
See application file for complete search history.

(56) References Cited

U.S. PATENT DOCUMENTS

| | | |
|---|---|---|
| 208,330 A | 9/1878 | Palmer |
| 351,968 A | 11/1886 | Derrick |
| D25,916 S | 8/1896 | Woods |
| 568,876 A | 10/1896 | Regan |
| 579,418 A | 3/1897 | Bookwalter |
| 582,397 A | 5/1897 | Shone |
| 658,586 A | 9/1900 | Reiling |
| 930,095 A | 8/1909 | Seagrave |
| 931,757 A | 8/1909 | Harmer |
| 941,671 A | 11/1909 | Campbell |
| 1,093,907 A | 4/1914 | Birnbaum |
| 1,154,974 A | 9/1915 | Custer |
| 1,486,156 A | 3/1924 | Needham |
| 2,127,188 A | 8/1938 | Schellin et al. |
| 2,149,930 A | 3/1939 | Plastaras |
| D134,562 S | 12/1942 | Murphy |
| 2,307,014 A | 1/1943 | Becker et al. |
| 2,320,964 A | 6/1943 | Yates |
| 2,353,318 A | 7/1944 | Scheller |
| 2,388,093 A | 10/1945 | Smith |
| 2,530,808 A | 11/1950 | Cerasi |
| 2,565,954 A | 8/1951 | Dey |
| 2,686,652 A | 8/1954 | Carlson et al. |
| 2,723,200 A | 11/1955 | Pyenson |
| 2,763,406 A | 9/1956 | Countryman |
| 2,764,454 A | 9/1956 | Edelstein |
| 2,785,926 A | 3/1957 | Lataste |
| 2,790,680 A | 4/1957 | Rosholt |
| 2,831,618 A | 4/1958 | Soffer et al. |
| 2,839,225 A | 6/1958 | Soffer et al. |
| 2,908,446 A | 10/1959 | Strouse |
| 2,932,434 A | 4/1960 | Abplanalp |
| 2,965,270 A | 12/1960 | Soffer et al. |
| 1,968,441 A | 1/1961 | Holcomb |
| 2,976,897 A | 3/1961 | Beckworth |
| 2,997,243 A | 8/1961 | Kolb |
| 3,083,872 A | 4/1963 | Meshberg |
| 3,107,059 A | 10/1963 | Frechette |
| 3,167,525 A | 1/1965 | Thomas |
| 3,191,809 A | 6/1965 | Schultz et al. |
| 3,196,819 A | 7/1965 | Lechner et al. |
| 3,198,394 A | 8/1965 | Lefer |
| 3,216,628 A | 11/1965 | Fergusson |
| 3,246,850 A | 4/1966 | Bourke |
| 3,258,208 A | 6/1966 | Greenebaum, II |
| 3,284,007 A | 11/1966 | Clapp |
| 3,314,571 A | 4/1967 | Greenebaum, II |
| 3,317,140 A | 5/1967 | Smith |
| 3,342,382 A | 9/1967 | Huling |

(Continued)

FOREIGN PATENT DOCUMENTS

| | | |
|---|---|---|
| CA | 770467 | 10/1967 |
| CA | 976125 | 10/1975 |

(Continued)

OTHER PUBLICATIONS

Homax Products, Inc., "Easy Touch Spray Texture" brochure, Mar. 1992, 1 page.

Chadwick, "Controlling Particle Size in Self-Pressurized Aerosol Packages", Metal Finishing, Jul./Aug. 2004, vol. 102 No. 7/8.

Newman-Green, Inc., "Aerosol Valves, Sprayheads & Accessories Catalog", Apr. 1, 1992, pp. 14, 20, and 22.

*Primary Examiner* — Peter Szekely

(74) *Attorney, Agent, or Firm* — Michael R. Schacht; Schacht Law Office, Inc.

(57) ABSTRACT

A system for dispensing texture material in a desired spray pattern that substantially matches an existing texture pattern on a target surface comprises an aerosol dispenser, concentrate, and propellant material. The aerosol dispenser has an inner surface comprised at least in part of tin-plated steel. The concentrate comprises a solvent/carrier comprising water, a resin/binder, filler material, a first anti-corrosion material, and a second anti-corrosion material. The first anti-corrosion material is a phosphate ester and comprises approximately 0.5-2.0% by weight of the concentrate. The second anti-corrosion material is sodium nitrite and comprises approximately 0.05-1.00% by weight of the concentrate.

19 Claims, 4 Drawing Sheets

(56) References Cited

U.S. PATENT DOCUMENTS

| | | |
|---|---|---|
| 3,346,195 A | 10/1967 | Groth |
| 3,373,908 A | 3/1968 | Crowell |
| 3,377,028 A | 4/1968 | Bruggeman |
| 3,390,121 A | 6/1968 | Burford |
| 3,414,171 A | 12/1968 | Grisham et al. |
| 3,415,425 A | 12/1968 | Knight et al. |
| 3,425,600 A | 2/1969 | Abplanalp |
| 3,428,224 A | 2/1969 | Eberhardt et al. |
| 3,433,391 A | 3/1969 | Krizka et al. |
| 3,450,314 A | 6/1969 | Gross |
| 3,467,283 A | 9/1969 | Kinnavy |
| 3,472,457 A | 10/1969 | McAvoy |
| 3,482,738 A | 12/1969 | Bartels |
| 3,514,042 A | 5/1970 | Freed |
| 3,544,258 A | 12/1970 | Presant et al. |
| 3,548,564 A | 12/1970 | Bruce et al. |
| 3,575,319 A | 4/1971 | Safianoff |
| 3,592,359 A | 7/1971 | Marraffino |
| 3,596,835 A | 8/1971 | Smith et al. |
| 3,608,822 A * | 9/1971 | Berthoud ................... 239/8 |
| 3,613,954 A | 10/1971 | Bayne |
| 3,648,932 A | 3/1972 | Ewald et al. |
| 3,653,558 A | 4/1972 | Shay |
| 3,698,645 A | 10/1972 | Coffey |
| 3,700,136 A | 10/1972 | Ruekberg |
| 3,703,994 A | 11/1972 | Nigro |
| 3,704,811 A | 12/1972 | Harden, Jr. |
| 3,704,831 A | 12/1972 | Clark |
| 3,764,067 A | 10/1973 | Coffey et al. |
| 3,773,706 A | 11/1973 | Dunn, Jr. |
| 3,776,470 A | 12/1973 | Tsuchiya |
| 3,776,702 A | 12/1973 | Chant |
| 3,777,981 A | 12/1973 | Probst et al. |
| 3,788,521 A | 1/1974 | Laauwe |
| 3,795,366 A | 3/1974 | McGhie et al. |
| 3,799,398 A | 3/1974 | Morane et al. |
| 3,806,005 A | 4/1974 | Prussin et al. |
| 3,811,369 A | 5/1974 | Ruegg |
| 3,813,011 A | 5/1974 | Harrison et al. |
| 3,814,326 A | 6/1974 | Bartlett |
| 3,819,119 A | 6/1974 | Coffey et al. |
| 3,828,977 A | 8/1974 | Borchert |
| 3,848,778 A | 11/1974 | Meshberg |
| 3,862,705 A | 1/1975 | Beres et al. |
| 3,871,553 A | 3/1975 | Steinberg |
| 3,891,128 A | 6/1975 | Smrt |
| 3,912,132 A | 10/1975 | Stevens |
| 3,913,803 A * | 10/1975 | Laauwe ................... 222/402.11 |
| 3,913,804 A | 10/1975 | Laauwe |
| 3,913,842 A | 10/1975 | Singer |
| 3,932,973 A | 1/1976 | Moore |
| 3,936,002 A | 2/1976 | Geberth, Jr. |
| 3,938,708 A | 2/1976 | Burger |
| 3,975,554 A | 8/1976 | Kummins et al. |
| 3,982,698 A | 9/1976 | Anderson |
| 3,989,165 A | 11/1976 | Shaw et al. |
| 3,991,916 A | 11/1976 | Del Bon |
| 3,992,003 A | 11/1976 | Visceglia et al. |
| 4,010,134 A | 3/1977 | Braunisch et al. |
| 4,032,064 A | 6/1977 | Giggard |
| 4,036,673 A | 7/1977 | Murphy et al. |
| 4,045,860 A | 9/1977 | Winckler |
| 4,089,443 A | 5/1978 | Zrinyi |
| 4,096,974 A | 6/1978 | Haber et al. |
| 4,117,951 A | 10/1978 | Winckler |
| 4,129,448 A * | 12/1978 | Greenfield et al. ........ 106/18.32 |
| 4,147,284 A | 4/1979 | Mizzi |
| 4,148,416 A | 4/1979 | Gunn-Smith |
| 4,154,378 A | 5/1979 | Paoletti et al. |
| 4,164,492 A | 8/1979 | Cooper |
| RE30,093 E | 9/1979 | Burger |
| 4,171,757 A | 10/1979 | Diamond |
| 4,185,758 A | 1/1980 | Giggard |
| 4,187,959 A | 2/1980 | Pelton |
| 4,187,985 A | 2/1980 | Goth |
| 4,198,365 A | 4/1980 | Pelton |
| 4,238,264 A | 12/1980 | Pelton |
| 4,275,172 A | 6/1981 | Barth et al. |
| 4,293,353 A | 10/1981 | Pelton et al. |
| 4,308,973 A | 1/1982 | Irland |
| 4,310,108 A | 1/1982 | Motoyama et al. |
| 4,322,020 A | 3/1982 | Stone |
| 4,346,743 A | 8/1982 | Miller |
| 4,354,638 A | 10/1982 | Weinstein |
| 4,358,388 A | 11/1982 | Daniel et al. |
| 4,370,930 A | 2/1983 | Strasser et al. |
| 4,372,475 A | 2/1983 | Goforth et al. |
| 4,401,271 A | 8/1983 | Hansen |
| 4,401,272 A | 8/1983 | Merton et al. |
| 4,411,387 A | 10/1983 | Stern et al. |
| 4,417,674 A | 11/1983 | Giuffredi |
| 4,438,221 A | 3/1984 | Fracalossi et al. |
| 4,442,959 A | 4/1984 | Del Bon et al. |
| 4,460,719 A | 7/1984 | Danville |
| 4,482,662 A | 11/1984 | Rapaport et al. |
| 4,496,081 A | 1/1985 | Farrey |
| 4,546,905 A | 10/1985 | Nandagiri et al. |
| 4,609,608 A | 9/1986 | Solc |
| 4,641,765 A | 2/1987 | Diamond |
| 4,683,246 A | 7/1987 | Davis et al. |
| 4,702,400 A | 10/1987 | Corbett |
| 4,728,007 A | 3/1988 | Samuelson et al. |
| 4,744,495 A | 5/1988 | Warby |
| 4,761,312 A | 8/1988 | Koshi et al. |
| 4,793,162 A | 12/1988 | Emmons |
| 4,804,144 A | 2/1989 | Denman |
| 4,815,414 A | 3/1989 | Duffy et al. |
| 4,819,838 A | 4/1989 | Hart, Jr. |
| 4,830,224 A | 5/1989 | Brison |
| 4,839,393 A | 6/1989 | Buchanan et al. |
| 4,854,482 A | 8/1989 | Bergner |
| 4,870,805 A | 10/1989 | Morane |
| 4,878,599 A | 11/1989 | Greenway |
| 4,887,651 A | 12/1989 | Santiago |
| 4,893,730 A | 1/1990 | Bolduc |
| 4,896,832 A | 1/1990 | Howlett |
| D307,649 S | 5/1990 | Henry |
| 4,940,171 A | 7/1990 | Gilroy |
| 4,949,871 A | 8/1990 | Flanner |
| 4,953,759 A | 9/1990 | Schmidt |
| 4,954,544 A | 9/1990 | Chandaria |
| 4,955,545 A | 9/1990 | Stern et al. |
| 4,961,537 A | 10/1990 | Stern |
| 4,969,577 A | 11/1990 | Werding |
| 4,969,579 A | 11/1990 | Behar |
| 4,988,017 A | 1/1991 | Schrader et al. |
| 4,991,750 A | 2/1991 | Moral |
| 5,007,556 A | 4/1991 | Lover |
| 5,009,390 A | 4/1991 | McAuliffe, Jr. et al. |
| 5,037,011 A | 8/1991 | Woods |
| 5,038,964 A | 8/1991 | Bouix |
| 5,052,585 A | 10/1991 | Bolduc |
| 5,059,187 A | 10/1991 | Sperry et al. |
| 5,065,900 A | 11/1991 | Scheindel |
| 5,069,390 A | 12/1991 | Stern et al. |
| 5,100,055 A | 3/1992 | Rokitenetz et al. |
| 5,115,944 A | 5/1992 | Nikolich |
| 5,126,086 A | 6/1992 | Stoffel |
| 5,169,037 A | 12/1992 | Davies et al. |
| 5,182,316 A | 1/1993 | DeVoe et al. |
| 5,188,263 A | 2/1993 | Woods |
| 5,188,295 A | 2/1993 | Stern et al. |
| 5,211,317 A | 5/1993 | Diamond et al. |
| 5,297,704 A | 3/1994 | Stollmeyer |
| 5,307,964 A | 5/1994 | Toth |
| 5,310,095 A | 5/1994 | Stern et al. |
| 5,312,888 A | 5/1994 | Nafziger et al. |
| 5,314,097 A | 5/1994 | Smrt et al. |
| 5,323,963 A | 6/1994 | Ballu |
| 5,341,970 A | 8/1994 | Woods |
| 5,368,207 A | 11/1994 | Cruysberghs |
| 5,374,434 A | 12/1994 | Clapp et al. |
| 5,405,051 A | 4/1995 | Miskell |
| 5,409,148 A | 4/1995 | Stern et al. |

(56) References Cited

U.S. PATENT DOCUMENTS

| | | |
|---|---|---|
| 5,417,357 A | 5/1995 | Yquel |
| D358,989 S | 6/1995 | Woods |
| 5,421,519 A | 6/1995 | Woods |
| 5,425,824 A | 6/1995 | Marwick |
| 5,450,983 A | 9/1995 | Stern et al. |
| 5,467,902 A | 11/1995 | Yquel |
| 5,476,879 A | 12/1995 | Woods et al. |
| 5,489,048 A | 2/1996 | Stern et al. |
| 5,498,282 A | 3/1996 | Miller et al. |
| 5,501,375 A | 3/1996 | Nilson |
| 5,505,344 A | 4/1996 | Woods |
| 5,523,798 A | 6/1996 | Hagino et al. |
| 5,524,798 A | 6/1996 | Stern et al. |
| 5,544,783 A | 8/1996 | Conigliaro |
| 5,548,010 A | 8/1996 | Franer |
| 5,549,228 A | 8/1996 | Brown |
| 5,558,247 A | 9/1996 | Caso |
| 5,562,235 A | 10/1996 | Cruysberghs |
| 5,570,813 A | 11/1996 | Clark, II |
| 5,573,137 A | 11/1996 | Pauls |
| 5,583,178 A | 12/1996 | Oxman et al. |
| 5,597,095 A | 1/1997 | Ferrara, Jr. |
| 5,639,026 A | 6/1997 | Woods |
| 5,641,095 A | 6/1997 | de Laforcade |
| 5,645,198 A | 7/1997 | Stern et al. |
| 5,655,691 A | 8/1997 | Stern et al. |
| 5,715,975 A | 2/1998 | Stern et al. |
| 5,727,736 A | 3/1998 | Tryon |
| 5,752,631 A | 5/1998 | Yabuno et al. |
| 5,792,465 A | 8/1998 | Hagarty |
| 5,799,879 A | 9/1998 | Ottl et al. |
| 5,865,351 A | 2/1999 | De Laforcade |
| 5,894,964 A | 4/1999 | Barnes et al. |
| 5,915,598 A | 6/1999 | Yazawa et al. |
| 5,921,446 A | 7/1999 | Stern |
| 5,934,518 A | 8/1999 | Stern et al. |
| 5,941,462 A | 8/1999 | Sandor |
| 5,957,333 A | 9/1999 | Losenno et al. |
| 5,975,356 A | 11/1999 | Yquel et al. |
| 5,988,575 A | 11/1999 | Lesko |
| 6,000,583 A | 12/1999 | Stern et al. |
| 6,027,042 A | 2/2000 | Smith |
| 6,032,830 A | 3/2000 | Brown |
| 6,039,306 A | 3/2000 | Pericard et al. |
| 6,070,770 A | 6/2000 | Tada et al. |
| 6,092,698 A | 7/2000 | Bayer |
| 6,095,435 A | 8/2000 | Greer, Jr. et al. |
| 6,112,945 A | 9/2000 | Woods |
| 6,113,070 A | 9/2000 | Holzboog |
| 6,116,473 A | 9/2000 | Stern et al. |
| 6,129,247 A | 10/2000 | Thomas et al. |
| 6,131,777 A | 10/2000 | Warby |
| 6,152,335 A | 11/2000 | Stern et al. |
| 6,161,735 A | 12/2000 | Uchiyama et al. |
| 6,168,093 B1 | 1/2001 | Greer, Jr. et al. |
| 6,170,717 B1 | 1/2001 | Di Giovanni et al. |
| D438,111 S | 2/2001 | Woods |
| 6,225,393 B1 | 5/2001 | Woods |
| 6,254,015 B1 | 7/2001 | Abplanalp |
| 6,257,503 B1 | 7/2001 | Baudin |
| 6,261,631 B1 | 7/2001 | Lomasney et al. |
| 6,265,459 B1 | 7/2001 | Mahoney et al. |
| 6,276,570 B1 | 8/2001 | Stern et al. |
| 6,283,171 B1 | 9/2001 | Blake |
| 6,290,104 B1 | 9/2001 | Bougamont et al. |
| 6,296,155 B1 | 10/2001 | Smith |
| 6,296,156 B1 | 10/2001 | Lasserre et al. |
| 6,299,679 B1 | 10/2001 | Montoya |
| 6,299,686 B1 | 10/2001 | Mills |
| 6,315,152 B1 | 11/2001 | Kalisz |
| 6,325,256 B1 | 12/2001 | Liljeqvist et al. |
| 6,328,185 B1 | 12/2001 | Stern et al. |
| 6,328,197 B1 | 12/2001 | Gapihan |
| 6,352,184 B1 | 3/2002 | Stern et al. |
| 6,362,302 B1 | 3/2002 | Boddie |
| 6,375,036 B1 | 4/2002 | Woods |
| 6,382,474 B1 | 5/2002 | Woods et al. |
| 6,386,402 B1 | 5/2002 | Woods |
| 6,394,321 B1 | 5/2002 | Bayer |
| 6,394,364 B1 | 5/2002 | Abplanalp |
| 6,395,794 B2 | 5/2002 | Lucas et al. |
| 6,398,082 B2 | 6/2002 | Clark et al. |
| 6,399,687 B2 | 6/2002 | Woods |
| 6,415,964 B2 | 7/2002 | Woods |
| 6,439,430 B1 | 8/2002 | Gilroy, Sr. et al. |
| 6,446,842 B2 | 9/2002 | Stern et al. |
| 6,474,513 B2 | 11/2002 | Burt |
| 6,478,198 B2 | 11/2002 | Haroian |
| 6,478,561 B2 | 11/2002 | Braun et al. |
| 6,482,392 B1 | 11/2002 | Zhou et al. |
| 6,510,969 B2 | 1/2003 | Di Giovanni et al. |
| 6,531,528 B1 | 3/2003 | Kurp |
| 6,536,633 B2 | 3/2003 | Stern et al. |
| 6,581,807 B1 | 6/2003 | Mekata |
| 6,588,628 B2 | 7/2003 | Abplanalp et al. |
| 6,595,393 B2 | 7/2003 | Loghman-Adham et al. |
| 6,615,827 B2 | 9/2003 | Greenwood et al. |
| 6,637,627 B1 | 10/2003 | Liljeqvist et al. |
| 6,641,005 B1 | 11/2003 | Stern et al. |
| 6,641,864 B2 | 11/2003 | Woods |
| 6,652,704 B2 | 11/2003 | Green |
| 6,659,312 B1 * | 12/2003 | Stern et al. .................. 222/402.1 |
| 6,666,352 B1 | 12/2003 | Woods |
| 6,688,492 B2 | 2/2004 | Jaworski et al. |
| 6,712,238 B1 | 3/2004 | Mills |
| 6,726,066 B2 | 4/2004 | Woods |
| 6,736,288 B1 | 5/2004 | Green |
| 6,758,373 B2 | 7/2004 | Jackson et al. |
| 6,797,051 B2 | 9/2004 | Woods |
| 6,802,461 B2 | 10/2004 | Schneider |
| 6,832,704 B2 | 12/2004 | Smith |
| 6,837,396 B2 | 1/2005 | Jaworski et al. |
| 6,843,392 B1 | 1/2005 | Walker |
| 6,848,601 B2 | 2/2005 | Greer, Jr. |
| 6,851,575 B2 | 2/2005 | van't Hoff |
| 6,880,733 B2 | 4/2005 | Park |
| 6,883,688 B1 | 4/2005 | Stern et al. |
| 6,894,095 B2 | 5/2005 | Russo et al. |
| 6,905,050 B1 * | 6/2005 | Stern et al. .................. 222/402.1 |
| 6,910,608 B2 | 6/2005 | Greer, Jr. et al. |
| 6,913,407 B2 | 7/2005 | Greer et al. |
| 6,926,178 B1 | 8/2005 | Anderson |
| 6,932,244 B2 | 8/2005 | Meshberg |
| 6,966,467 B2 | 11/2005 | Di Giovanni et al. |
| 6,971,553 B2 | 12/2005 | Brennan et al. |
| 6,978,916 B2 | 12/2005 | Smith |
| 6,978,947 B2 | 12/2005 | Jin |
| 6,981,616 B2 | 1/2006 | Loghman-Adham et al. |
| 7,014,073 B1 | 3/2006 | Stern et al. |
| 7,014,127 B2 | 3/2006 | Valpey, III et al. |
| 7,036,685 B1 | 5/2006 | Green |
| 7,059,497 B2 | 6/2006 | Woods |
| 7,059,546 B2 | 6/2006 | Ogata et al. |
| 7,063,236 B2 | 6/2006 | Greer, Jr. et al. |
| 7,104,424 B2 | 9/2006 | Kolanus |
| 7,104,427 B2 | 9/2006 | Pericard et al. |
| 7,121,434 B1 | 10/2006 | Caruso |
| 7,163,962 B2 | 1/2007 | Woods |
| 7,182,227 B2 | 2/2007 | Poile et al. |
| 7,189,022 B1 | 3/2007 | Greer, Jr. et al. |
| 7,192,985 B2 | 3/2007 | Woods |
| 7,240,857 B1 * | 7/2007 | Stern et al. .................. 239/337 |
| 7,278,590 B1 * | 10/2007 | Greer et al. .................. 239/337 |
| 7,307,053 B2 * | 12/2007 | Tasz et al. .................. 510/384 |
| 2001/0002676 A1 | 6/2001 | Woods |
| 2002/0003147 A1 | 1/2002 | Corba |
| 2002/0100769 A1 | 8/2002 | McKune |
| 2002/0119256 A1 | 8/2002 | Woods |
| 2003/0102328 A1 | 6/2003 | Abplanalp et al. |
| 2003/0134973 A1 * | 7/2003 | Chen et al. .................. 524/804 |
| 2003/0183651 A1 | 10/2003 | Greer, Jr. |
| 2003/0205580 A1 | 11/2003 | Yahav |
| 2004/0012622 A1 | 1/2004 | Russo et al. |
| 2004/0099697 A1 | 5/2004 | Woods |

(56) References Cited

U.S. PATENT DOCUMENTS

| | | | |
|---|---|---|---|
| 2004/0141797 A1* | 7/2004 | Garabedian et al. | 401/279 |
| 2004/0157960 A1 | 8/2004 | Rowe | |
| 2004/0195277 A1 | 10/2004 | Woods | |
| 2005/0121474 A1 | 6/2005 | Lasserre et al. | |
| 2005/0161531 A1 | 7/2005 | Greer, Jr. et al. | |
| 2005/0236436 A1 | 10/2005 | Woods | |
| 2005/0256257 A1* | 11/2005 | Betremieux et al. | 524/556 |
| 2006/0049205 A1 | 3/2006 | Green | |
| 2006/0079588 A1 | 4/2006 | Greer | |
| 2006/0180616 A1 | 8/2006 | Woods | |
| 2006/0219808 A1 | 10/2006 | Woods | |
| 2006/0219811 A1 | 10/2006 | Woods | |
| 2006/0273207 A1 | 12/2006 | Woods | |
| 2007/0117916 A1* | 5/2007 | Anderson et al. | 524/556 |
| 2007/0155892 A1* | 7/2007 | Gharapetian et al. | 524/556 |
| 2007/0194040 A1* | 8/2007 | Tasz et al. | 222/4 |

FOREIGN PATENT DOCUMENTS

| | | |
|---|---|---|
| CA | 1191493 | 8/1985 |
| CA | 1210371 | 8/1986 |
| CA | 2145129 | 9/1995 |
| CA | 2090185 | 10/1998 |
| CA | 2291599 | 6/2000 |
| CA | 2381994 | 2/2001 |
| CA | 2327903 | 6/2001 |
| CA | 2065534 | 8/2003 |
| CA | 2448794 | 5/2004 |
| CA | 2504509 | 10/2005 |
| CA | 2504513 | 10/2005 |
| CH | 680849 | 11/1992 |
| DE | 210449 | 5/1909 |
| DE | 1926796 | 3/1970 |
| DE | 3808438 | 4/1989 |
| DE | 3806991 | 9/1989 |
| FR | 463476 | 2/1914 |
| FR | 84727 | 4/1964 |
| FR | 1586067 | 2/1970 |
| FR | 2659847 | 9/1991 |
| GB | 867713 | 5/1961 |
| GB | 977860 | 12/1964 |
| GB | 1144385 | 5/1969 |
| GB | 2418959 | 12/2006 |
| JP | 461392 | 1/1971 |
| JP | 8332414 | 6/1995 |
| WO | 9418094 | 8/1994 |

* cited by examiner

US 8,551,572 B1

SPRAY TEXTURE MATERIAL COMPOSITIONS, SYSTEMS, AND METHODS WITH ANTI-CORROSION CHARACTERISTICS

RELATED APPLICATIONS

This application, U.S. patent application Ser. No. 13/610,743 filed Sep. 11, 2012, is a continuation of U.S. patent application Ser. No. 13/396,538 filed Feb. 14, 2012, now abandoned.

U.S. patent application Ser. No. 13/396,538 is a continuation of U.S. patent application Ser. No. 13/181,326 filed Jul. 12, 2011, now abandoned.

U.S. patent application Ser. No. 13/181,326 is a continuation of U.S. patent application Ser. No. 12/837,254 filed Jul. 15, 2010, now abandoned.

U.S. patent application Ser. No. 12/837,254 is a continuation of U.S. patent application Ser. No. 12/080,096 filed Mar. 31, 2008, now abandoned.

U.S. patent application Ser. No. 12/080,096 claims benefit of U.S. Provisional Patent Application Ser. No. 60/922,041 filed Apr. 4, 2007.

The contents of all related patent applications listed above are incorporated herein by reference.

TECHNICAL FIELD

The present invention relates to materials for forming a textured coating on a target surface and, more particularly, to compositions of water-based texture materials and systems and methods for dispensing water-based texture materials from either aluminum or tin-plated steel containers.

BACKGROUND

The surfaces of drywall materials defining wall and ceiling surfaces are commonly coated with texture materials. Texture materials are coatings that are deposited in discrete drops that dry to form a bumpy, irregular texture on the destination surface. Texture materials are commonly applied using a hopper gun connected to a source of pressurized air. However, when only a small are is to be coated or an existing textured surface is repaired, texture materials are typically applied using an aerosol dispensing system.

An aerosol dispensing system for dispensing texture material typically comprises a container assembly, a valve assembly, and an outlet assembly. The container assembly contains the texture material and a propellant material. The propellant material pressurizes the texture material within the container assembly. The valve assembly is mounted to the container assembly in a normally closed configuration but can be placed in an open configuration to define a dispensing path along which the pressurized texture material is forced out of the container assembly by the propellant material. Displacement of the outlet assembly places the valve assembly in the open configuration. The outlet assembly defines a portion of the outlet path and is configured such that the texture material is applied to the destination surface in an applied texture pattern.

The texture material dispensed by an aerosol dispensing system may employ a solvent base, a water base, or a base containing a combination of water and water soluble solvents. A solvent based texture material dries quickly but can be malodorous and may require the use of complementary solvent cleaners for clean up. A water based texture material is typically not malodorous and can be cleaned using water but can take significantly longer to dry. A water/solvent based texture material can be cleaned using water, is typically not unacceptably malodorous, and has a dry time somewhere between solvent based and water based texture materials.

The propellant used by aerosol dispensing systems for texture materials may simply be a compressed inert gas such as air or nitrogen. More typically, the propellant used by aerosol dispensing systems is a bi-phase propellant material, including mixtures of volatile hydrocarbons such as propane, n-butane, isobutane, dimethyl ether (DME), and methylethyl ether.

At room temperature, bi-phase propellant materials typically exist in both liquid and vapor states within the container assembly. Prior to use, the vapor portion of the bi-phase propellant material is pressurized to an equilibrium pressure. When the valve assembly is placed in its open configuration, the vapor portion of the bi-phase propellant material forces the texture material out of the container assembly along the dispensing path.

When the valve assembly returns to its closed position, part of the liquid portion of the bi-phase propellant material changes to the vapor state because of the drop in pressure within the container assembly. The vapor portion of the propellant material returns the pressure within the container assembly to the equilibrium value in preparation for the next time texture material is to be dispensed from the aerosol dispensing system.

The container assembly typically comprises a metal tube structure formed by a rectangular metal sheet that is rolled and joined at two overlapping edges to form a seam. A bottom cap and end cap are welded or crimped onto the tube structure. The valve assembly and the outlet assembly are typically supported by the end cap.

Aerosol container assemblies are typically made of either tin-plated steel or aluminum. Aluminum container assemblies are typically used for water based or water/solvent based texture materials because the water in the formulation promotes corrosion and aluminum is less susceptible to corrosion. However, the costs and availability of aluminum and tin-plated steel aerosol container assemblies may differ.

The need thus exists for formulations of either water based or water/solvent based texture materials that may be used in either aluminum or tin-plated steel aerosol container assemblies without significant risk of corrosion.

SUMMARY

The present invention may be embodied as a system for dispensing texture material in a desired spray pattern that substantially matches an existing texture pattern on a target surface, comprising an aerosol dispenser, a concentrate, and a propellant material. The aerosol dispenser comprises a container assembly and an actuator assembly. The container assembly defines an inner surface, and the inner surface defines a main chamber and is at least in part a tin-plated steel. The actuator assembly defines an outlet opening having a cross-sectional area, where the cross-sectional area of the outlet opening is adjustable. The concentrate comprises a solvent/carrier comprising water, a resin/binder, filler material, a first anti-corrosion material, where the first anti-corrosion material is a phosphate ester and comprises approximately 0.5-2.0% by weight of the concentrate, and a second anti-corrosion material, where the second anti-corrosion material is sodium nitrite and comprises approximately 0.05-1.00% by weight of the concentrate. The concentrate and propellant material are disposed within the container assembly such that the water is exposed to the inner surface of the container assembly. At least one of the first and second anti-corrosion materials forms a film on the inner surface of the container assembly. The film inhibits corrosion of the inner surface of the container assembly. The cross-sectional area of the outlet opening is adjusted such that the propellant material forces the concentrate out of the outlet opening in a spray pattern that forms the desired texture pattern on the target surface.

The present invention may also be embodied as a method of dispensing texture material onto a target surface comprising the following steps. An aerosol dispenser is provided. The aerosol container comprises a container assembly defining an inner surface, where at least a portion of the inner surface is made of tin-plated steel. A concentrate is formed by mixing a solvent/carrier comprising water, a resin/binder, filler material, a first anti-corrosion material, where the first anti-corrosion material is a phosphate ester and comprises approximately 0.5-2.0% by weight of the concentrate, and a second anti-corrosion material, where the second anti-corrosion material is sodium nitrite and comprises approximately 0.05-1.00% by weight of the concentrate. The concentrate and a propellant material are arranged within the container assembly such that at least one of the first and second anti-corrosion materials forms a thin protective film on the inner surface. The aerosol dispenser is operated such that the propellant material forces the concentrate in a spray pattern that forms the desired texture pattern on the target surface.

DETAILED DESCRIPTION

Figure 1:
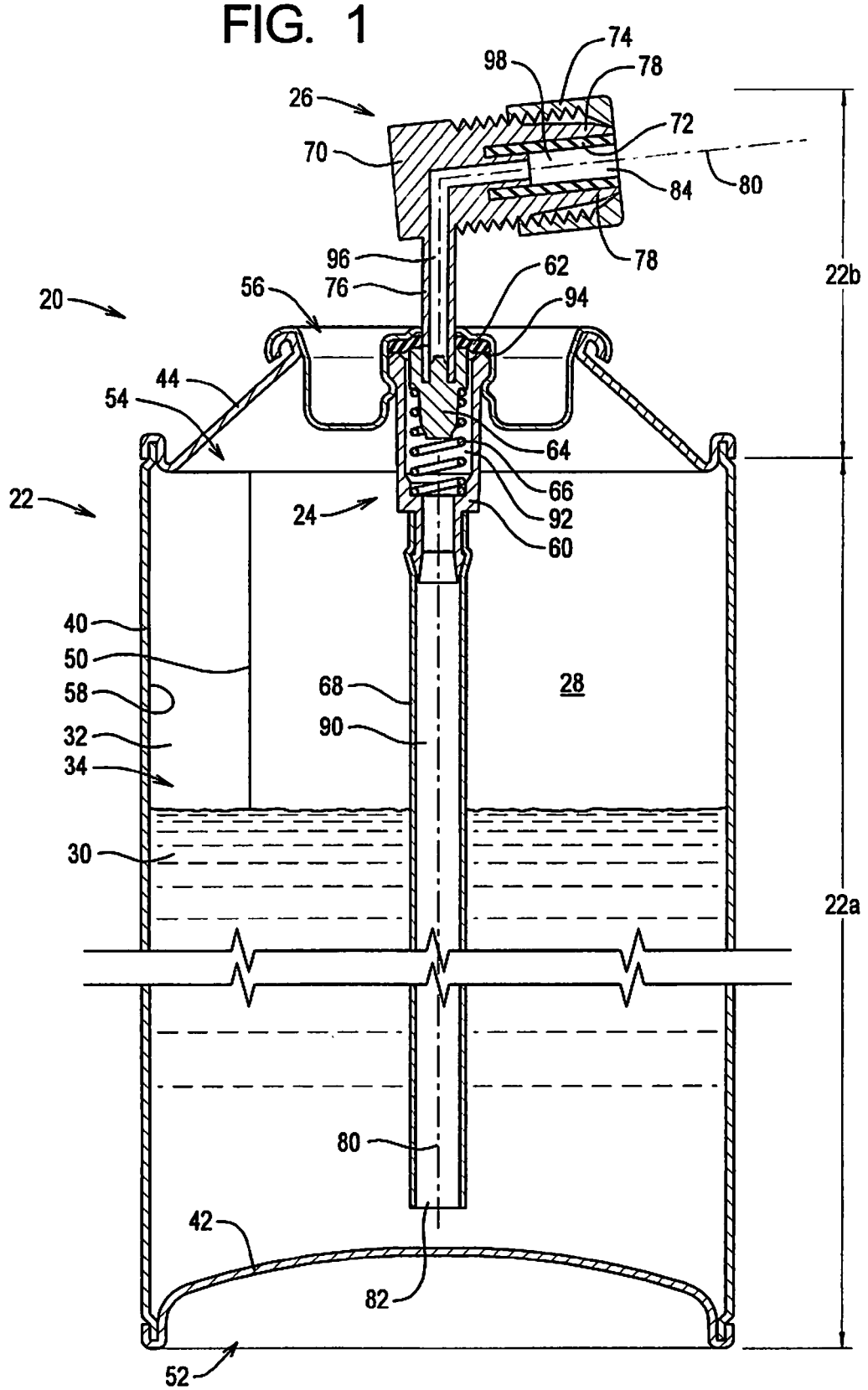
FIG. 1 is a section view of a first example aerosol dispensing system for texture material of the present invention.

Referring initially to FIG. 1 of the drawing, depicted therein is an example aerosol dispensing system 20 constructed in accordance with, and embodying, the principles of the present invention. The example aerosol dispensing system 20 comprises a container assembly 22, a valve assembly 24, and an outlet assembly 26. The container assembly 22 and valve assembly 24 define a main chamber 28.

The main chamber 28 contains a liquid material 30 and a vapor material 32. The liquid material 30 comprises texture material and propellant material in liquid form. The vapor material 32 comprises propellant material in vapor form. The liquid material 30 comprises propellant material in liquid form and a texture material concentrate. The combination of the liquid material 30 and the vapor material 32 in the container assembly 22 will be referred to as the contained material 34.

When the valve assembly 24 is in a closed configuration, the flow of fluid out of the main chamber 28 is substantially prevented. However, the vapor material 32 pressurizes the liquid material 30 within the main chamber 28 such that, when the valve assembly 24 is in an open configuration, the vapor material 32 forces the liquid material 30 out of the main chamber 28.

As perhaps best shown in FIG. 1, the example container assembly 22 comprises a main member 40, a bottom cap 42, and an end cap 44 formed of tin-plated steel. The tin-plated steel used to form the main member 40, bottom cap 42, and end cap 44 comprises a thin sheet of steel coated on one side by an even thinner layer (approximately 0.5 microns) of tin.

The main member 40 is a rectangular sheet that is rolled into a cylinder and welded along a seam 50 to define first and second end openings 52 and 54. The bottom cap 42 is a shaped tin-plated steel member that is crimped onto the cylindrical main member 40 to seal the first end opening 52. The end cap 44 is also a shaped tin-plated steel member defining a mounting opening 56; the end cap 44 is crimped onto the main member 40 such that fluid may not flow through the second opening 54 between the end cap 44 and the main member 40. The main member 40, bottom cap 42, and end cap 44 define an interior metal surface 58 of the container assembly 22.

With the bottom cap 42 covering the first opening 52, the end cap 44 covering the second opening 54, and the valve assembly 24 supported by the end cap 44, the aerosol dispensing system 20 defines the main chamber 28.

Because the interior metal surface 58 of the container assembly 22 is metal and is thus susceptible to corrosion, the texture material concentrate is formulated to have anti-corrosion properties. The example texture material concentrate is generally formulated as follows.

| GENERAL EXAMPLE OF TEXTURE MATERIAL CONCENTRATE | | |
| --- | --- | --- |
| COMPONENT | FIRST PREFERRED RANGE | SECOND PREFERRED RANGE |
| solvent/carrier | 30-60% | 25-65% |
| resin/binder | 4.5-5.5% | 3-7% |
| fillers | 40-60% | 20-70% |
| additives | 0.250-0.750% | 0.000-1.000% |
| first anti-corrosion material | 0.5-2% | 0.1-5.0% |
| second anti-corrosion material | 0.05-1% | 0.025-2.0% |

The texture material concentrate described in the table set forth above is combined in the container assembly 22 with the propellant material to obtain the contained material 34. The preferred amount of propellant material used to form the example dispensing system 20 is approximately 12.5% of the texture material concentrate by weight and is preferably within a first preferred range of 10-15% and is in any event preferably within a second preferred range of 5-20%.

In the context of the example container assembly 22 comprising tin-plated steel components, the first and second anti-corrosion materials are included to promote passive corrosion behavior of the metal interior surface 58 of the container assembly 22 in contact with the texture material concentrate. Passive corrosion behavior occurs when the interaction between a metal structure and the environment forms a thin protective film on the surface of the metal structure. Passive corrosion produces essentially no corrosion of the metal structure and thus is very desirable.

In the example texture material concentrate, the first anti-corrosion material is Elfugin, which is an anionic, phosphate ester. Elfugin is a proprietary product sold by Clariant Paper Chemicals as an antistatic for application to paper products. In the general example described above, approximately 1.00% (±5%) of the first anti-corrosion material is preferably used. The second anti-corrosion material of the example texture material concentrate is sodium nitrite. In the general example described above, approximately 0.100% (±5%) or 0.250% (±5%) of the first anti-corrosion material is preferably used, depending upon the nature of the remaining components of the texture material concentrate and propellant.

The texture material concentrate is preferably formulated and combined with propellant material as follows. The first and second anti-corrosion materials are initially dissolved in the water. The remaining materials are then mixed with the water solution to obtain the texture material concentrate.

The bottom cap 42 is crimped onto the main member 40 to form a container subassembly 22a. The valve assembly 24 is combined with the end cap 44 to form a cap subassembly 22b. The texture material concentrate is placed within the container subassembly 22a. The cap subassembly 22b is crimped onto the container subassembly 22a to form the container assembly 22. The propellant material is then introduced into the container assembly 22 through the valve assembly 24. The outlet assembly 26 is then engaged with the valve assembly to form the aerosol dispensing system 20.

With the foregoing general understanding of the present invention, the details of several example formulations of the texture material concentrate and the construction and use of the example aerosol dispensing system 20 will now be described in further detail.

As described above, the present invention is of particular significance when applied to aerosol dispensing systems for dispensing texture material. Texture materials are sold in different forms depending upon such factors as dry time, ease of application, and the type of texture pattern desired. Set forth below are four tables containing formulations of example texture material concentrates.

The example contained materials incorporating the following texture material concentrates are preferably formed by first combining the first and second anti-corrosion materials with the water. The remaining materials are then mixed into the combination of the water and the anti-corrosion materials to form the texture material concentrates identified in the tables below. The resulting texture material concentrate is then mixed with the propellant material to form the contained material as generally described above.

First Example of Texture Material Concentrate

When sprayed onto a target surface as will be described in further detail below, the first example texture material concentrate forms what is commonly referred to as a "knockdown" spray texture pattern. A knockdown spray texture is formed by a bumpy, irregular texture pattern that is lightly worked with a tool after application to the target surface such that the tops of the bumps formed by the texture material are flattened.

| COMPONENT | PREFERRED | FIRST PREFERRED RANGE | SECOND PREFERRED RANGE |
|---|---|---|---|
| solvent/carrier (water) | 48.72% | 43-53% | 38-58% |
| first anti-corrosion material (Elfugin) | 1.0% | 0.5-2.0% | 0.1-5.0% |
| second anti-corrosion material (Sodium Nitrite) | 0.25% | 0.05-1.0% | 0.025-2% |
| additive (biocide) | 0.10% | 0.05-0.50% | 0.25-0.10% |
| Homax Wall Texture | 50.93 | 46-56% | 41-61% |

In the foregoing example, the amounts of the first and second anti-corrosion materials are preferably held to tolerances of substantially ±5% of the amounts specified in the foregoing table.

The Homax Wall Texture ingredient is a proprietary mixture supplied to the Applicant by Hamilton Materials Northwest. Generally speaking, the Homax Wall Texture ingredient comprises a binder (starch), pigments like calcium carbonate, talc, mica, attapulgite clay, and possibly others. Additionally, this type of material typically comprises a biocide and defoamers.

The ratio of the first example contained material to propellant should be within a first range of approximately 7:1 to 15:1 and in any event should be within a second range of approximately to 20:1. To obtain the example contained material 34, one part DME (propellant) is combined with 9.42 parts of the first example texture material described in the foregoing table.

Second Example of Texture Material Concentrate

When sprayed onto a target surface as will be described in further detail below, the second example texture material concentrate forms what is commonly referred to as an "orange peel" spray texture pattern. An orange peel spray texture comprises rounded, irregular bumps on the target surface that generally resemble the surface of an orange. By varying the parameters of the spray pattern, the size and depth of the bumps can be varied to obtain different aesthetic looks. The second example texture material concentrate further changes color while drying such that the color indicates when the texture material is sufficiently dry for the application of a top coat such as a coat of primer or paint.

| COMPONENT | PREFERRED | FIRST PREFERRED RANGE | SECOND PREFERRED RANGE |
|---|---|---|---|
| solvent/carrier (water, proponal) | 34.965% | 30-40% | 25-45% |
| first anti-corrosion material (Elfugin) | 1.000% | 0.5-2.0% | 0.1-5.0% |
| second anti-corrosion material (Sodium Nitrite) | 0.100% | 0.05-1.0% | 0.025-2% |
| additives (biocides, defoamer, dispersant) | 0.530% | 0.250-0.750% | 0.000%-1.000% |
| resin/binder (latex) | 5.127% | 4.100-6.100% | 2.600-7.600% |
| filler (thickener, clay, talc, calcium carbonate) | 58.275% | 53-63% | 48-68% |
| color change agent (Bromothymol Blue) | 0.003% | 0.002-0.003% | 0.001-0.010% |

In the foregoing example, the amounts of the first and second anti-corrosion materials are preferably held to the following tolerances. The amount of the first anti-corrosion material used should be substantially within ±5% of the amount specified in the foregoing table. The amount of the first anti-corrosion material used should be substantially within +0% and −5% of the amount specified in the foregoing table.

The ratio of the second example contained material to propellant should be within a first range of approximately 7:1 to 15:1 and in any event should be within a second range of approximately 5:1 to 20:1. To obtain the example contained material 34, one part DME (propellant) is combined with 9.42 parts of the first example texture material described in the foregoing table.

Third Example of Texture Material Concentrate

When sprayed onto a target surface as will be described in further detail below, the second example texture material concentrate forms what an orange peel spray texture pattern. As with the second example texture material concentrate described above, varying the parameters of the spray pattern varies the size and depth of the bumps forming the orange peel pattern to obtain different aesthetic looks.

| COMPONENT | PREFERRED | FIRST PREFERRED RANGE | SECOND PREFERRED RANGE |
|---|---|---|---|
| solvent/carrier (water, propanol) | 34.970% | 30-40% | 25-45% |
| first anti-corrosion material (Elfugin) | 1.000% | 0.500-2.000% | 0.100-5.000% |
| second anti-corrosion material (Sodium Nitrite) | 0.250% | 0.050-1.000% | 0.025-2.00% |
| Additives (biocides, defoanner, dispersant) | 0.530% | 0.250-0.750% | 0.000%-1.000% |
| resin/binder (latex) | 5.127% | 4.100-6.100% | 2.600-7.600% |
| Filler (thickener, clay, talc, calcium carbonate) | 58.123% | 53-63% | 48-68% |

In the foregoing example, the amounts of the first and second anti-corrosion materials are preferably held to tolerances of substantially ±5% of the amounts specified in the foregoing table.

The ratio of the third example contained material to propellant should be within a first range of approximately 7:1 to 15:1 and in any event should be within a second range of approximately 5:1 to 20:1. To obtain the example contained material 34, one part DME (propellant) is combined with 9.42 parts of the first example texture material described in the foregoing table.

Fourth Example of Texture Material Concentrate

When sprayed onto a target surface as will be described in further detail below, the fourth example texture material concentrate forms what is commonly referred to as a "popcorn" or "acoustic" spray texture pattern. A popcorn or acoustic spray texture pattern comprises visible particulates that are adhered to the target surface by binders in the base. The particulates somewhat resemble popcorn and provide acoustic dampening qualities that reduce echoing off of the target surface on which the popcorn or acoustic spray texture pattern is formed.

| COMPONENT | PREFERRED | FIRST PREFERRED RANGE | SECOND PREFERRED RANGE |
|---|---|---|---|
| solvent/carrier (water) | 57.05% | 52-62% | 47-67% |
| first anti-corrosion material (Elfugin) | 1.02% | 0.500-2.000% | 0.100-5.000% |
| second anti-corrosion material (Sodium Nitrite) | 0.25% | 0.050-1.000% | 0.025-2.00% |
| Additives (biocide) | 0.10% | 0.050-0.500% | 0.250-0.100% |
| Homax Wall Texture | 40.76% | 36-46% | 31-51% |
| particulate (Melamine Foam) | 0.82% | 0.6-1.5% | 0.25-5.0% |

In the foregoing example, the amounts of the first and second anti-corrosion materials are preferably held to tolerances of substantially ±5% of the amounts specified in the foregoing table.

The ratio of the fourth example contained material to propellant should be within a first range of approximately 12:1 to 15:1 and in any event should be within a second range of approximately 10:1 to 20:1. To obtain the example contained material 34, one part DME (propellant) is combined with 13.29 parts of the fourth example texture material described in the foregoing table.

Referring again to FIG. 1 of the drawing, the details of construction and operation of the example dispensing system 20 will now be described in further detail.

The example valve assembly 24 comprises a valve housing 60, a valve seat 62, a valve member 64, and a valve spring 66. The end cap 44 supports the valve housing 60 and the valve seat 62 adjacent to the mounting opening 56. The valve housing 60 supports the valve spring 66 such that the valve spring 66 biases the valve member 64 against the valve seat 62 in a normally closed position. An intake tube 68 extends from the valve housing 60 to the end of the main member 40 closed by the bottom cap 42.

The outlet assembly 26 comprises an actuator member 70, a resilient member 72, and a clamp member 74. The actuator member defines a stem portion 76 and a plurality of finger portions 78. The stem portion 76 extends through the mounting opening 56 and engages the valve member 64. The actuator member 70 supports the resilient member 72 such that the resilient member 72 is held within the finger portions 78. The clamp member 74 engages the actuator member 70 such that displacement of the clamp member 74 relative to the actuator member 70 bends the finger portions 78 towards each other to deform the resilient member 72.

A dispensing path 80 extends between an inlet opening 82 defined by the intake tube 68 and an outlet opening 84 defined by the resilient member 72. Fluid is prevented from flowing along the dispensing path 80 when the valve assembly 24 is in the closed configuration as defined above. Fluid may flow along the dispensing path 80 when the valve assembly 24 is in the open configuration. The spray pattern of liquid flowing out of the main chamber 28 through the outlet opening 84 may be varied by deforming the resilient member 72 as described above.

More specifically, the valve spring 66 normally biases the valve member 64 against the valve seat 62 to close the dispensing path 80. When the actuator member 70 is displaced towards the container assembly 22, the valve member 64 is displaced away from the valve seat 62 against the force of the valve spring 66 to place the valve assembly 24 in its open configuration. In this open configuration, the example dispensing path 80 extends through a first passageway 90 defined by the intake tube 68, a valve chamber 92 defined by the valve housing 60, a gap 94 between valve member 64 and the valve seat 62, a second passageway 96 defined by the actuator member 70, and a fourth passageway 98 defined by the resilient member 72.

Figure 2A:
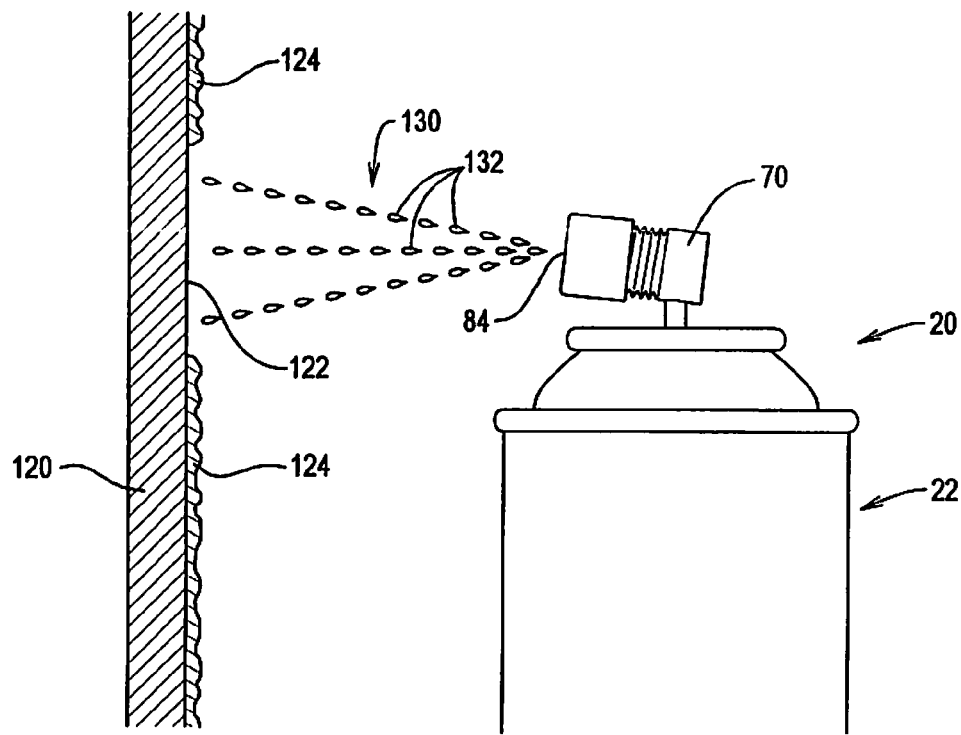
FIGS. 2A-2B are side elevation views depicting the process of using the aerosol dispensing system of FIG. 1 to apply texture material to a destination wall surface.
Figure 2B:
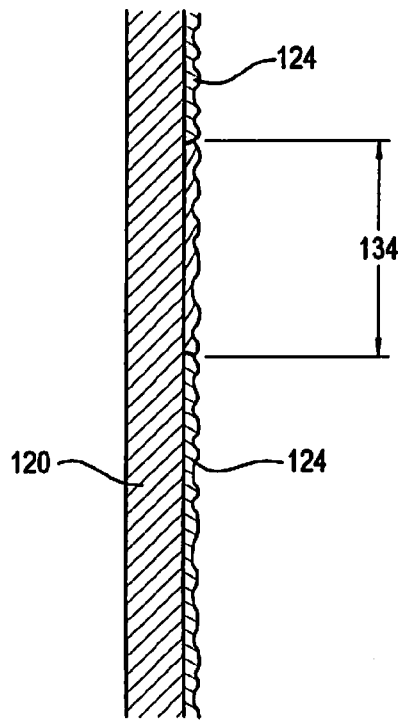

Turning now to FIGS. 2A-2B of the drawing, depicted therein is an example of use of the example dispensing system 20 described above. The example dispensing system 20 is used to apply texture material to a wall member 120 defining a target surface portion 122. In the case of a repair to the wall member 120, existing spray texture material 124 typically surrounds the target surface portion 122.

Initially, the dispensing system 20 is arranged such that the outlet opening 84 faces the target surface portion 122. The actuator member 70 is then displaced to place the valve assembly 24 in its open configuration. The pressurized propellant material causes a portion of the contained material 34 to be dispensed from the container assembly 22 through the dispensing path 80.

Because of the formulation of the contained material 34 and the geometry of the resilient member 72, the contained material exits the container assembly 22 in a spray 130 comprising discrete droplets 132. The droplets 132 are deposited onto the target surface 122 to form a texture coating 134 in an applied texture pattern. The texture coating 134 is initially wet but dries when exposed to air. In the case of a knockdown texture pattern, the texture coating 134 is worked to flatten the high points of the texture pattern when still wet. In the case of a color changing texture material, the texture coating 134 will be one color when wet and another color when dry.

By appropriately selecting the cross-sectional area of the outlet opening 84, the applied texture pattern of the texture coating 134 can be formed such that the applied texture pattern substantially matches the existing pattern of the existing texture material 124.

Figure 3:
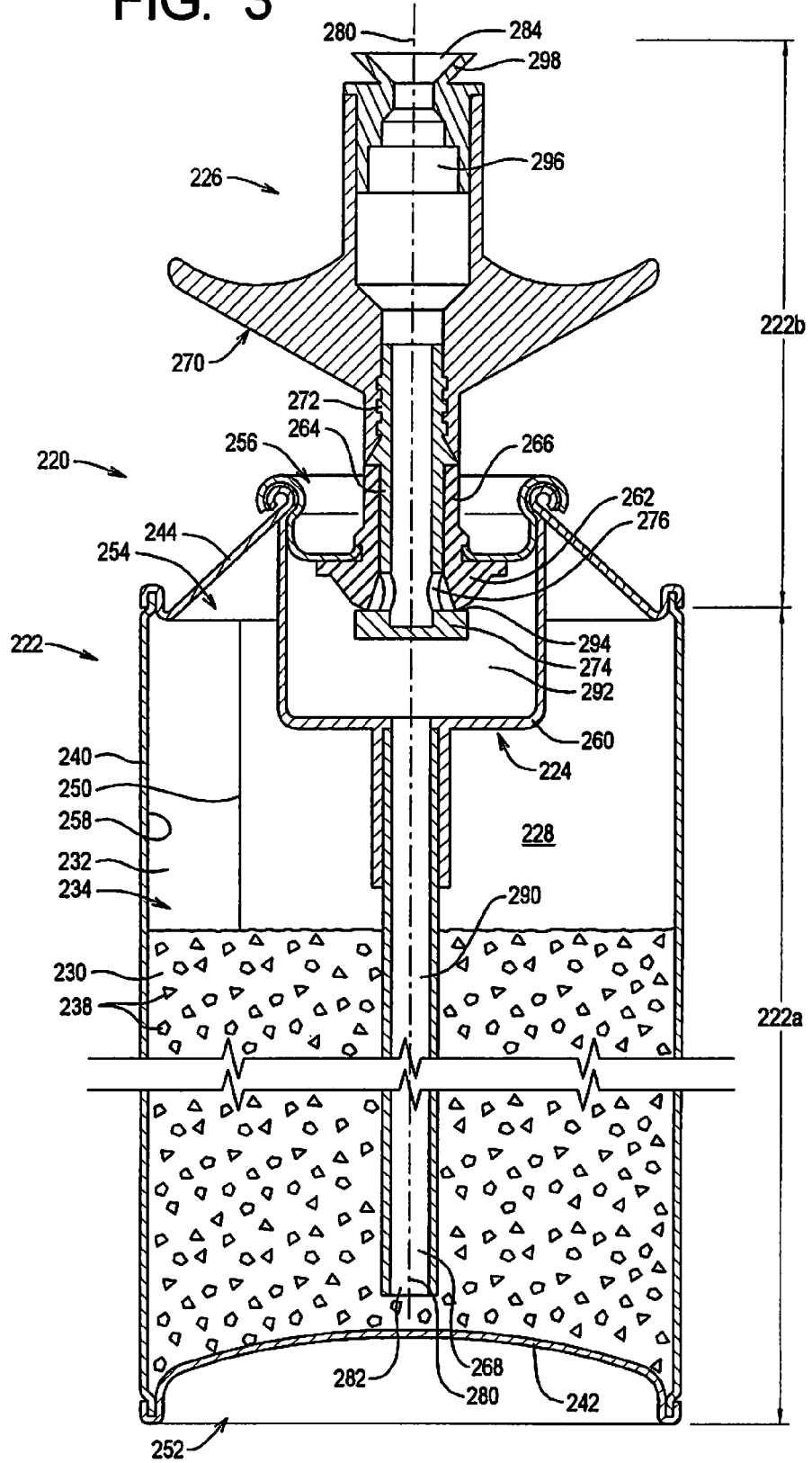
FIG. 3 is a section view of a second example aerosol dispensing system for texture material of the present invention.

The popcorn or acoustic texture material described above is best dispensed using a second example dispensing system 220 as depicted in FIG. 3. The aerosol dispensing system 220 comprises a container assembly 222, a valve assembly 224, and an outlet assembly 226. The container assembly 222 and valve assembly 224 define a main chamber 228.

The main chamber 228 contains a liquid material 230 and a vapor material 232. The liquid material 230 comprises texture material and propellant material in liquid form. The vapor material 232 comprises propellant material in vapor form. The liquid material 230 comprises propellant material in liquid form and a texture material concentrate. The combination of the liquid material 230 and the vapor material 232 in the container assembly 222 will be referred to as the contained material 234. FIG. 3 further illustrates that the contained material 234 comprises particulate material 238 as identified in the table above describing the example popcorn or acoustic texture material concentrate.

When the valve assembly 224 is in a closed configuration, the flow of fluid out of the main chamber 228 is substantially prevented. However, the vapor material 232 pressurizes the liquid material 230 within the main chamber 228 such that, when the valve assembly 224 is in an open configuration, the vapor material 232 forces the liquid material 230 out of the main chamber 228.

As perhaps best shown in FIG. 3, the example container assembly 222 comprises a main member 240, a bottom cap 242, and an end cap 244 formed of tin-plated steel. The tin-plated steel used to form the main member 240, bottom cap 242, and end cap 244 comprises a thin sheet of steel coated on one side by an even thinner layer (approximately 0.5 microns) of tin.

The main member 240 is a rectangular sheet that is rolled into a cylinder and welded along a seam 250 to define first and second end openings 252 and 254. The bottom cap 242 is a shaped tin-plated steel member that is crimped onto the cylindrical main member 240 to seal the first end opening 252. The end cap 244 is also a shaped tin-plated steel member defining a mounting opening 256; the end cap 244 is crimped onto the main member 240 such that fluid may not flow through the second opening 254 between the end cap 244 and the main member 240. The main member 240, bottom cap 242, and end cap 244 define an interior metal surface 258 of the container assembly 222.

With the bottom cap 242 covering the first opening 252, the end cap 244 covering the second opening 254, and the valve assembly 224 supported by the end cap 244, the aerosol dispensing system 220 defines the main chamber 228.

The bottom cap 242 is crimped onto the main member 240 to form a container subassembly 222a. The valve assembly 224 is combined with the end cap 244 to form a cap subassembly 222b. The texture material concentrate is placed within the container subassembly 222a. The cap subassembly 222b is crimped onto the container subassembly 222a to form the container assembly 222. The propellant material is then introduced into the container assembly 222 through the valve assembly 224. The outlet assembly 226 is then engaged with the valve assembly to form the aerosol dispensing system 220.

The example valve assembly 224 comprises a valve housing 260, a valve seat 262, and a stem member 264. The valve seat 262 defines a deformable portion 266. The end cap 244 supports the valve housing 260 and the valve seat 262 adjacent to the mounting opening 256. The valve housing 260 supports the deformable portion 266 such that the deformable portion 266 biases the stem member 264 against the valve seat 262 in a normally closed position. An intake tube 268 extends from the valve housing 260 to the end of the main member 240 closed by the bottom cap 242.

The outlet assembly 226 comprises an actuator member 270. The actuator member 270 is threaded onto a connecting portion 272 of the stem member 264. The stem member 264 further defines a valve portion 274 and a valve opening 276. The stem member 264 extends through the valve seat 262 such that the valve seat 262 supports the stem member 264 within the mounting opening 256. In particular, the stem member 264 extends through the mounting opening 256 such that the valve portion 274 is in contact with the valve seat 262 when the valve assembly 224 is in its closed configuration and not in contact with the valve seat 262 when the valve assembly 224 is in its opening configuration.

A dispensing path 280 extends between an inlet opening 282 defined by the intake tube 268 and an outlet opening 284 in the actuator 270. Fluid is prevented from flowing along the dispensing path 280 when the valve assembly 224 is in the closed configuration as defined above. Fluid may flow along the dispensing path 280 when the valve assembly 224 is in the open configuration. The outlet member 270 is configured to define the outlet opening 284 such that the spray pattern of liquid flowing out of the main chamber 228 through the outlet opening 282 is substantially fan-shaped.

More specifically, the deformable portion 266 of the valve seat 262 frictionally engages the stem member 264 such that the deformable portion 266 normally biases the stem member 264 to cause the valve portion 274 to engage the valve seat 262, thereby closing the dispensing path 280. When the actuator member 270 is displaced towards the container assembly 222, the stem member 264 is displaced, deforming the deformable portion 266, such that the valve portion 274 disengages from the valve seat 262 against the force of the deformable portion 266 to place the valve assembly 224 in its open configuration. The deformable portion 266 may be replaced with an external or internal spring member that similarly biases the valve assembly 224 into the closed configuration.

In the open configuration, the example dispensing path 280 extends through a first passageway 290 defined by the intake tube 268, a valve chamber 292 defined by the valve housing 260, a gap 294 between stem member 264 and the valve seat 262, the valve opening 276, and an outlet passageway 296 defined by the actuator member 270.

The actuator member 270 is configured to define a fan shaped outlet portion 298 of the outlet passageway 296 that forms a spray pattern appropriate for depositing the popcorn or acoustic texture material on the target surface in a desired texture pattern.

Figure 4A:
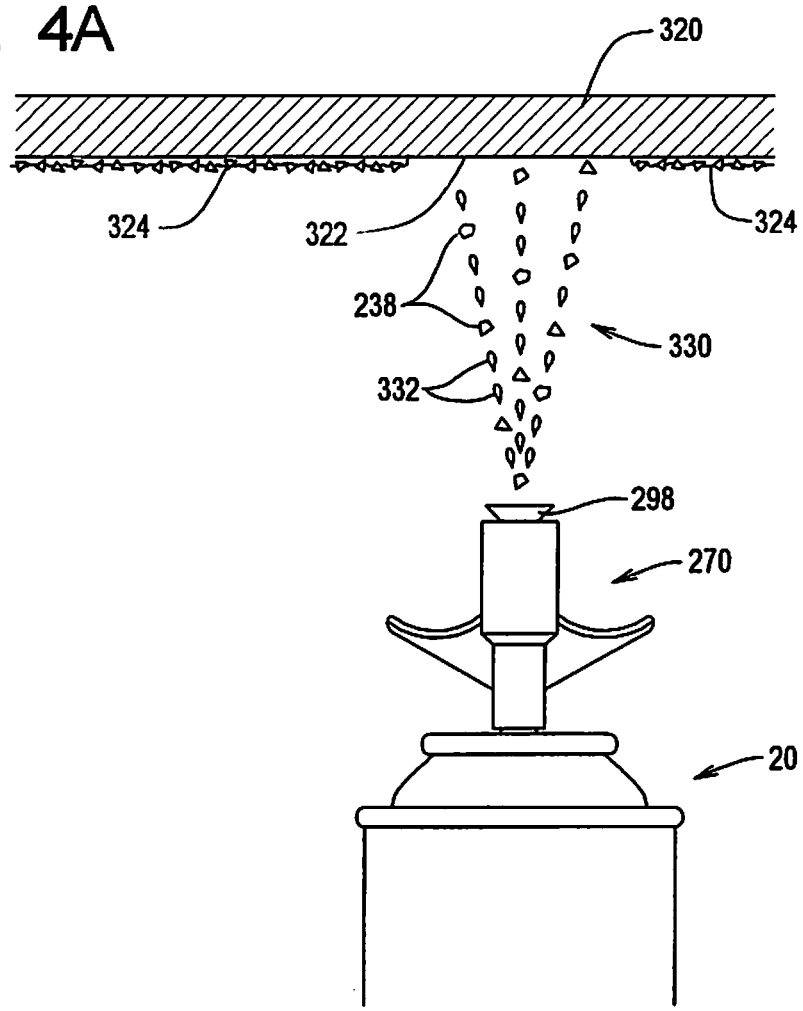
FIGS. 4A-4B are side elevation views depicting the process of using the aerosol dispensing system of FIG. 3 to apply texture material to a destination ceiling surface.
Figure 4B:
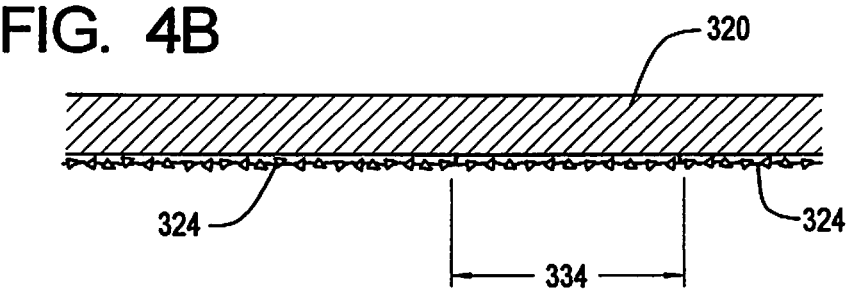

FIGS. 4A and 4B illustrate that the actuator member 270 is also configured such that the spray pattern may be directed upwards because popcorn or acoustic texture material is typically applied only to ceiling surfaces. In particular, FIG. 4A illustrates a wall member 320 defining a target surface portion 322. In the case of a repair to the wall member 320, existing spray texture material 324 typically surrounds the target surface portion 322.

Initially, the dispensing system 20 is arranged such that the outlet portion 298 of the outlet passageway 296 faces the target surface portion 322. The actuator member 270 is then displaced to place the valve assembly 224 in its open configuration. The pressurized propellant material causes a portion of the contained material 234 to be dispensed from the container assembly 222 through the dispensing path 280.

The contained material exits the container assembly 22 in a spray 330 comprising discrete droplets 332 and the particulate material 238. The droplets 332 are deposited onto the target surface 322 to form a texture coating 334 in an applied texture pattern. The particulate material 238 is bonded by the texture coating 234 to the target surface 322. The texture coating 334 is initially wet but dries when exposed to air. The applied texture pattern of the texture coating 334 can be formed such that the applied texture pattern substantially matches the existing pattern of the existing texture material 324.

The scope of the present invention should be determined by the claims appended hereto and not the foregoing detailed discussion of several examples of the present invention.

What is claimed is:

1. A system for dispensing texture material in a desired spray pattern that substantially matches an existing texture pattern on a target surface, comprising:
   an aerosol dispenser comprising
      a container assembly defining an inner surface, where the inner surface defines a main chamber; and is at least in part a tin-plated steel,
      an actuator assembly defining an outlet opening having a cross-sectional area, where the cross-sectional area of the outlet opening is adjustable;
   a concentrate comprising
      a solvent/carrier comprising water, where the solvent/carrier comprises approximately 25-65% of by weight of the concentrate,
      a resin/binder, where the resin/binder comprises approximately 3-7% by weight of the concentrate,
      filler material, where the filler material comprises approximately 20-70% by weight of the concentrate,
      a first anti-corrosion material, where the first anti-corrosion material is a phosphate ester and comprises approximately 0.5-2.0% by weight of the concentrate, and
      a second anti-corrosion material, where the second anti-corrosion material is sodium nitrite and comprises approximately 0.05-1.00% by weight of the concentrate; and
   a propellant material; wherein
   the concentrate and propellant material are disposed within the container assembly such that the water is exposed to the inner surface of the container assembly;
   at least one of the first and second anti-corrosion materials forms a film on the inner surface of the container assembly;
   the film inhibits corrosion of the inner surface of the container assembly; and
   the cross-sectional area of the outlet opening is adjusted such that the propellant material forces the concentrate out of the outlet opening in a spray pattern that forms the desired texture pattern on the target surface.

2. A system as recited in claim 1, in which the concentrate further comprises a biocide.

3. A system as recited in claim 1, in which the concentrate further comprises a defoamer.

4. A system as recited in claim 1, in which the concentrate further comprises a dispersant.

5. A system as recited in claim 1, in which the concentrate further comprises a color change material.

6. A system as recited in claim 1, in which the concentrate further comprises at least one additive selected from the group of additives consisting of a biocide, a defoamer, and a dispersant.

7. A system as recited in claim 6, in which the concentrate further comprises a color change material.

8. A system as recited in claim 1, in which the concentrate further comprises a particulate material.

9. A system as recited in claim 1, in which:
   at least a portion of the container assembly is formed by tin-plated steel; and
   the first and second anti-corrosion materials form a protective film on any portion of the container assembly that is formed by tin-plated steel exposed to the concentrate.

10. A method of dispensing texture material onto a target surface comprising the steps of:
    providing an aerosol dispenser comprising a container assembly defining an inner surface, where at least a portion of the inner surface is made of tin-plated steel;
    forming a concentrate by mixing
       a solvent/carrier comprising water, where the solvent/carrier comprises approximately 25-65% of by weight of the concentrate,
       a resin/binder, where the resin/binder comprises approximately 3-7% by weight of the concentrate,
       filler material, where the filler material comprises approximately 20-70% by weight of the concentrate,
       a first anti-corrosion material, where the first anti-corrosion material is a phosphate ester and comprises approximately 0.5-2.0% by weight of the concentrate, and
       a second anti-corrosion material, where the second anti-corrosion material is sodium nitrite and comprises approximately 0.05-1.00% by weight of the concentrate;
    arranging the concentrate and a propellant material within the container assembly such that at least one of the first and second anti-corrosion materials forms a thin protective film on the inner surface; and
    operating the aerosol dispenser such that the propellant material forces the concentrate in a spray pattern that forms the desired texture pattern on the target surface.

11. A method as recited in claim 10, further comprising the step of mixing a biocide into the concentrate.

12. A method as recited in claim 10, further comprising the step of mixing a defoamer into the concentrate.

13. A method as recited in claim 10, further comprising the step of mixing a dispersant into the concentrate.

14. A method as recited in claim 10, further comprising the step of mixing a color change material into the concentrate.

15. A method as recited in claim 10, further comprising the step of mixing into the concentrate at least one additive selected from the group of additives consisting of a biocide, a defoamer, and a dispersant.

16. A method as recited in claim 15, further comprising the step of mixing a color change material into the concentrate.

17. A method as recited in claim 10, further comprising the step of mixing a particulate material into the concentrate.

18. A system as recited in claim 1, in which the concentrate comprises:
   approximately 30-60% of the solvent/carrier by weight of the concentrate;
   approximately 4.5-5.5% of the resin/binder by weight of the concentrate; and
   approximately 40-60% of the filler material by weight of the concentrate.

19. A method as recited in claim 10, in which the step of forming the concentrate comprises the steps of mixing:
   approximately 30-60% of the solvent/carrier by weight of the concentrate;
   approximately 4.5-5.5% of the resin/binder by weight of the concentrate; and
   approximately 40-60% of the filler material by weight of the concentrate.

* * * * *